Sept. 14, 1965

C. T. LONGCROFT 3,206,729

SYSTEM FOR ASCERTAINING FROM A DISTANCE THE ELECTRICAL
CONDITIONS OF A SWITCHING DEVICE

Filed Dec. 22, 1961

INVENTOR
Cecil T. Longcroft

BY
Stevens, Davis, Miller & Mosher
ATTORNEYS

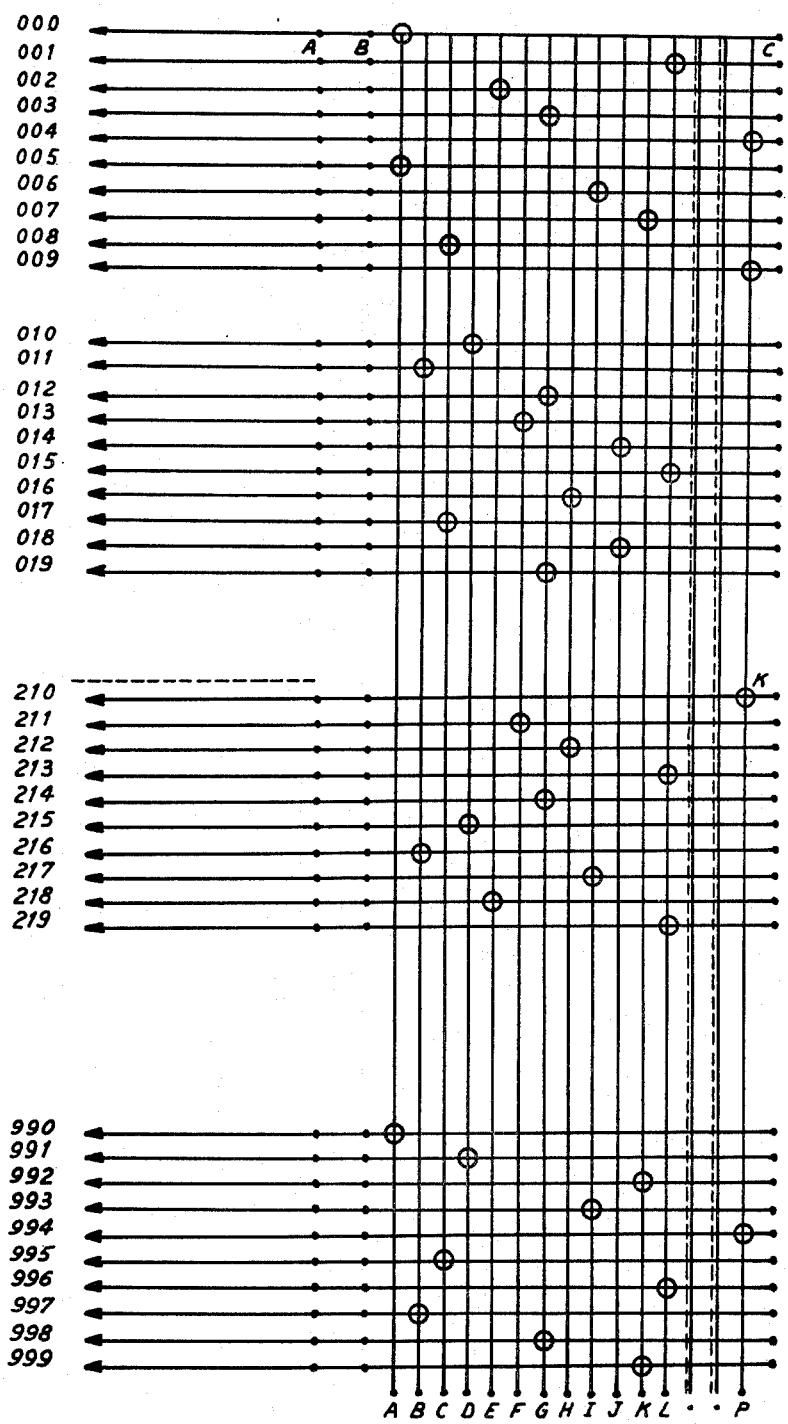

Sept. 14, 1965  C. T. LONGCROFT  3,206,729
SYSTEM FOR ASCERTAINING FROM A DISTANCE THE ELECTRICAL
CONDITIONS OF A SWITCHING DEVICE
Filed Dec. 22, 1961  4 Sheets-Sheet 4
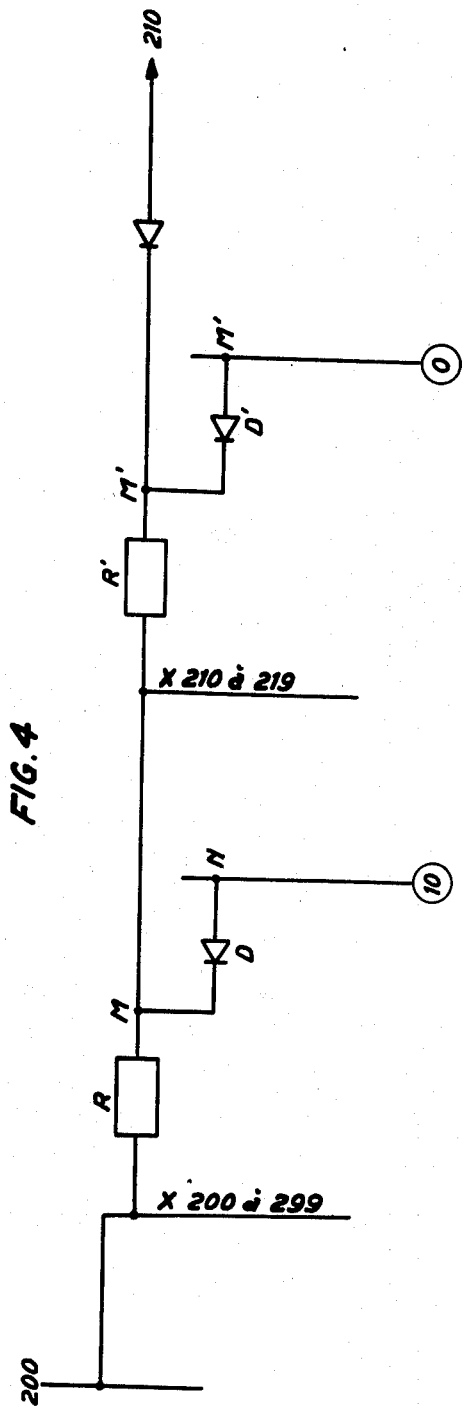
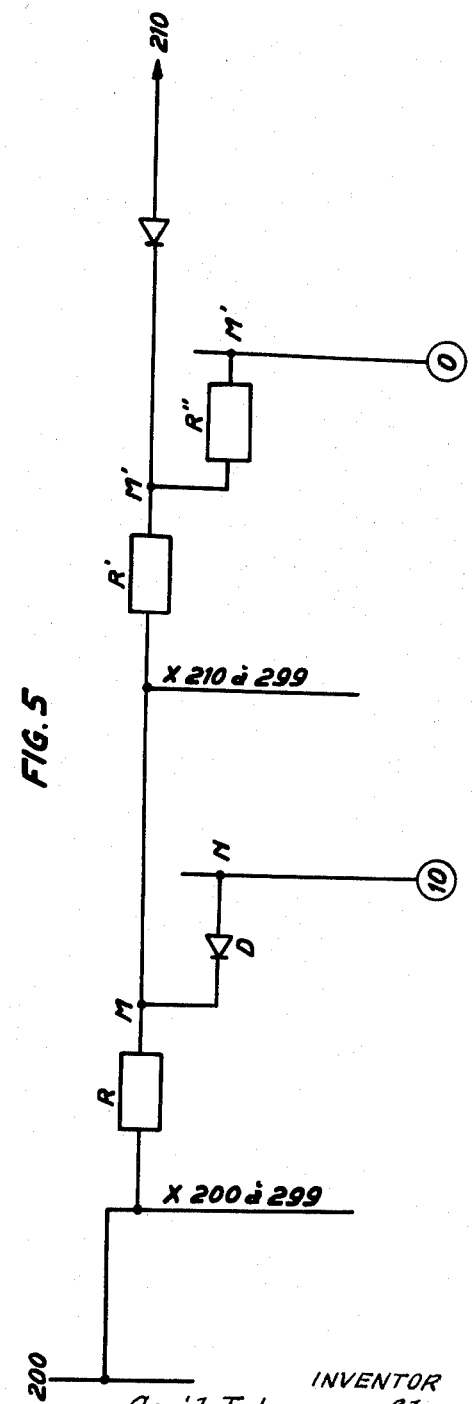
INVENTOR
Cecil T. Longcroft
BY Stevens, Davis, Miller & Mosher
ATTORNEYS

United States Patent Office 3,206,729
Patented Sept. 14, 1965

3,206,729
SYSTEM FOR ASCERTAINING FROM A DISTANCE THE ELECTRICAL CONDITIONS OF A SWITCHING DEVICE
Cecil Talbot Longcroft, Menton, France, assignor to Daniel Roger Hegelbacher, Levallois-Perret, France
Filed Dec. 22, 1961, Ser. No. 161,581
Claims priority, application France, Dec. 22, 1960, 848,000, Patent 1,283,363
1 Claim. (Cl. 340—166)

The present invention relates to a system for ascertaining from a distance the electrical conditions of a switching device such as a data display board and/or a cross-bar switch which may be suitably modified to operate as a data display board.

It is well known that a cross-bar switch may be used with slight modifications to represent for instance a planning board in which various interconnections between the verticals and the horizontals of the cross-bar switch are made to represent a given set of conditions. These interconnections may be varied according to changes of conditions.

It is often desired to be able, from a distance, to ascertain the state of conditions of the said planning board or cross-bar switch. The various means indicated for this purpose by the prior art present a number of drawbacks such as the use of a large number of interconnective wires or the use of complicated switching systems or testing devices leading to cumbersome equipments which are expensive to manufacture and costly to maintain.

The present invention has in particular for an object to overcome the above mentioned drawbacks as well as others which will appear from the following description.

Another object of the present invention is to provide a system of the type set forth in which the interrogation comprises a number of digits which can be sent simultaneously from the interrogative station to the interrogated station.

Another feature of the invention is to provide a system of the type set forth which is entirely static except for the interrogation key board and for the reading device of the state of the distant cross-bar device.

According to a feature of the present invention, there is provided a system comprising an interrogating key board, a set of transmission lines between said key board and a cross-bar device, with variable interconnected points, between the verticals and the horizontals of said cross-bar device, a circuit of the AND type being provided in the lines interconnecting said interrogating key board and said cross-bar device, a number of lines being provided between said cross-bar device and an answering device or indicating device provided at a distant station which may be different from the station where the interrogating key board is located.

Another feature of the invention resides in the construction of the cross-bar device which may be made according to the technique of printed circuits.

Another feature of the invention resides in the fact that the circuit of the AND type and the cross-bar device can be grouped in order that the interconnection lines between the circuits of the AND type and the cross-bar device may be made without soldered connections for instance by the technique of printed circuits.

Other objects and advantages of the present invention and a complete understanding thereof will be apparent from the following specification based on the accompanying drawings in which:

FIGURE 3 represents a display board with vertical and horizontal circuits carrying members arranged so as to be interconnected at will at one or more cross points.

FIGURES 4 and 5 represent details of the arrangements shown in the previous figures.

Figure 1:
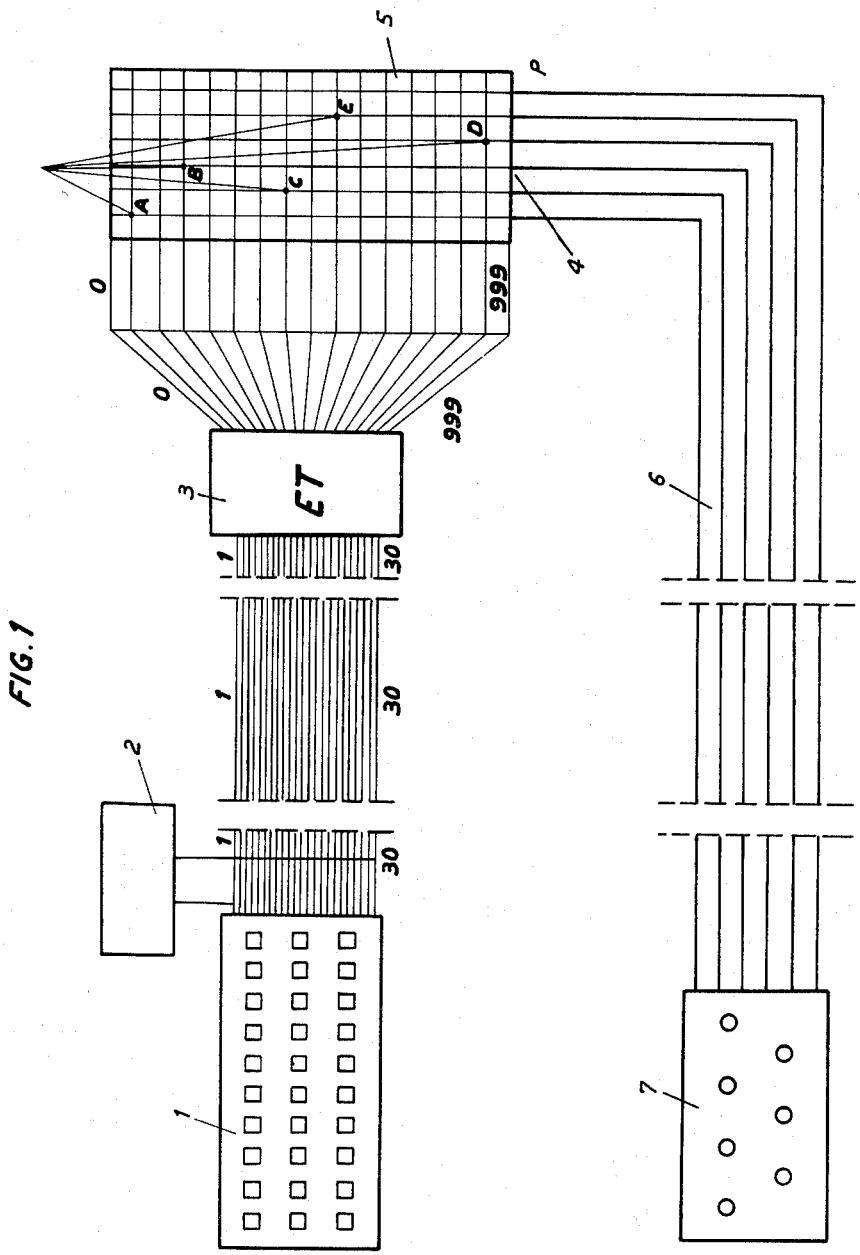
FIGURE 1 is a schematic diagram representing a preferred form of a system for ascertaining from a distance the electrical conditions of a switching device such as a cross-bar switch.

The present invention provides means for ascertaining from a distance the various values that the association N$p$ can assume for any combined set of digits 1, 2, 3 . . . N and 1, 2, 3 . . . $p$, wherein these values N and $p$ may represent any magnitude.

The present invention proposes to display from a distance by electrical or electronic means using the Boolean-algebra and controlled by means of a key board based on decimal or other numeration system, a number N corresponding to an order number of an information element and to transmit thereby also at a distance the electrical reading of a single number $p$ related to the information element N, thus permitting one to display $p$ on an electrical device with $p$ position, the device being of the visible type. Alternatively a proportional indicator may be used. In this case, each digit 1, 2, 3 . . . $p$ is given an electrical weight.

The present invention may make use of the following arrangement. A data display board is provided on which may be represented N informations each of which may be associated with any one of $kp$ different values. The display board may be made of a network of current carrying bars for instance a number of lines equal to the number of informations 1, 2, 3, N and a number of columns equal to the number of possible positions 1, 2, 3, $p$, the lines and the columns being normally insulated one from another. If it is desired to transmit the same number N of several informations, that is to say to associate to N several numbers $p$, $q$, $r$, etc. then an electrical association or twinning between the lines $p$, $q$, $r$, etc. and the line N by means of separating diodes at the input of each additional line may be provided.

For instance, the interconnection may be made by utilizing, in accordance with features of the present invention, printed circuits each set of printed circuits being insulated from the following one. On the first printed circuit there is traced horizontal conducting lines and on the second, vertical conducting lines; the sets of printed circuits being superposed so that at the points of intersection of the verticals and horizontals it is possible to provide holes for establishing by any suitable means an interconnection between the verticals and the horizontals, each intersection representing a particular value for the association N$p$.

An improvement in the device consists in the use of a single board printed on both sides, at the possible interconnection points holes are provided in the insulating board; on one side each line is covered with a metallic plate pierced with holes corresponding to those of the printed plate and of sufficient thickness to permit the establishment of a contact with a connective member introduced in the hole. The same process could be employed for each vertical column. A connecting member connects respectively to a line on one side of the board and to a column on the opposite side, thus making a contact between the wanted line and column.

It is also possible to keep only metallic plates or metallic rods without printed insulating plates, these conducting bars having soldered connections at their extremities and being insulated and maintained at various points by supporting rods. This avoids making holes in the printed circuit corresponding to those of the metallic plates and a step by step mounting of the different members becomes possible.

The data display board comprises as many electrical inputs as there are lines N and as many outputs as there are columns p. When current is applied to the line reference N if a connection K is placed at the intersection of this line N with the column p, the column p is fed with a voltage, and this voltage may be indicated for instance by means of a luminous indicator.

The invention will now be described with more details in connection with the accompanying drawings.

Referring to FIGURE 1, there is shown a block schematic of an installation incorporating features of the present invention. In this figure, 1 represents a so-called interrogating key board comprising 10 units k 0 . . . 9; 10 units of tens 00, 10, 20, 30 . . . 90, ten units of hundreds 000, 100, 200, 300 . . . 900. It is, therefore, possible by means of this key board, to send any number comprised between 0 and 999. The cabling of this key board is made in such a way that only 30 outgoing leads come out from the key board, certain leads being used in common by some of the keys of the key board one. These lines 1 to 30 are interconnected with a set of circuits of the AND unit referred to schematically by rectangle 3. These AND circuits provide 1000 outgoing lines 0 to 999 which correspond to 1000 horizontal lines N of an indicating or planning board 4, 5. On this planning board are also provided p vertical lines capable of being interconnected with said N horizontal lines at points marked A B C D E on FIGURE 1. These points of interconnection ABCDE may represent quantified representations of any magnitude. The vertical columns p are interconnected through p lines 6 with an indicator 7 located either close to the interrogating key board 1 or in certain cases, in different rooms from the one where the interrogating key board 1 is located.

The working of the arrangement shown in FIGURE 1 is then as follows:

If someone depresses simultaneously 3 keys of the key board, for example the keys corresponding to the number 210, then the current from source 2, feeds the system through the lines 1 to 30 and then the indicating display board and the interconnection point ABC etc. . . . and thereby the p verticals and through the interconnection lines 6, the indicating device 7. It will therefore be seen that with an entirely static device except for the key board and for the display device eventually, it is possible to transmit to a distance, in reply to an interrogation sent from the key board the status of the interconnections at any of the verticals and horizontals of the display board.

Figure 2:
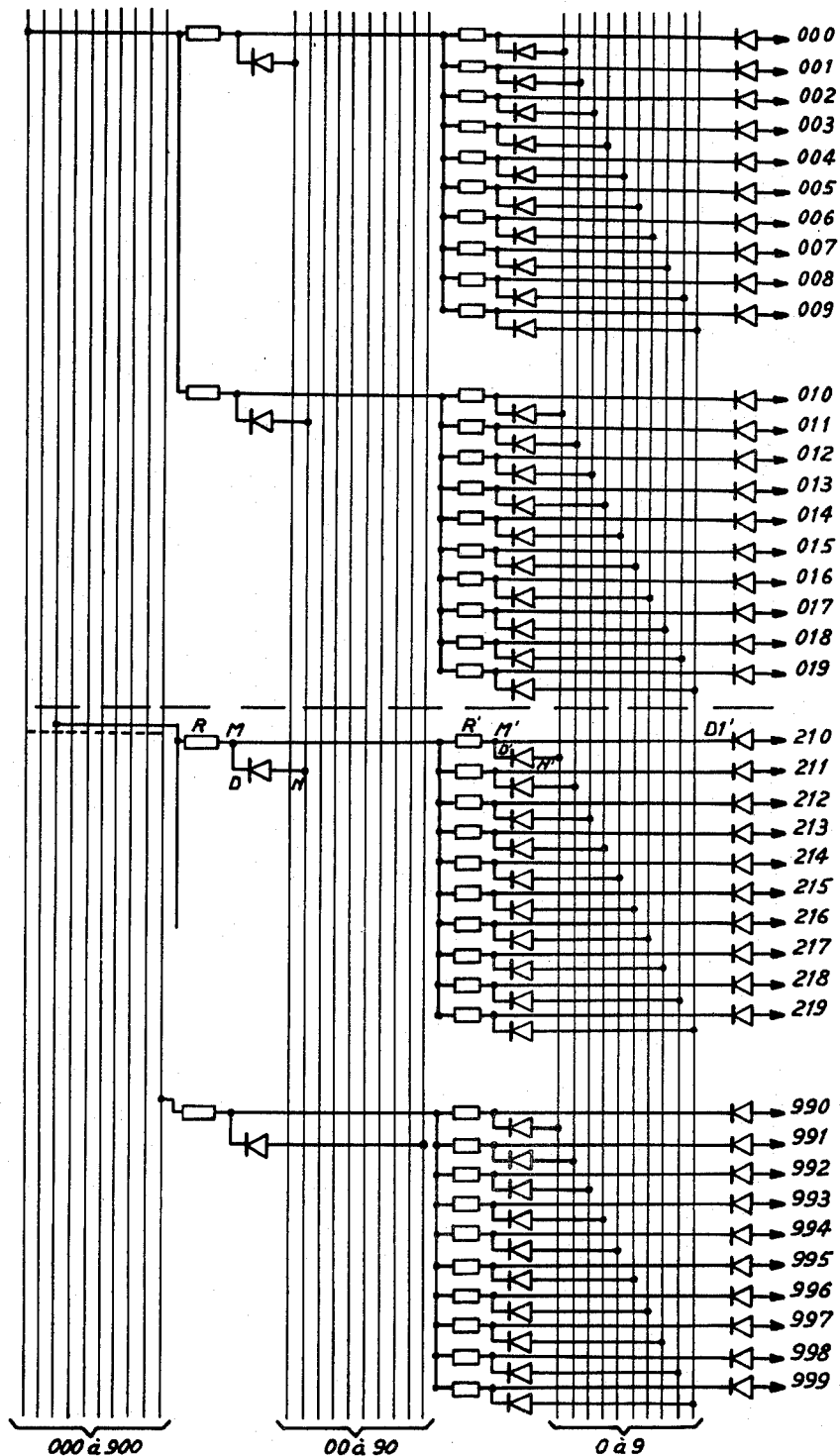
FIGURE 2 represents a set of circuits of the AND type together with their interconnection circuits.

Referring now to FIGURE 2, there is shown a set of vertical lines numbered respectively 0 to 9, 00 to 90, 000 to 900 corresponding to a similar numeration on the key board. Between any one of these verticals, for example the 3rd one from the left in FIGURE 2, and each input of the display board a separating diode D' is connected, as shown in FIGURE 3. As will be seen later, this input corresponds to an output of the associated AND circuit constituted by a resistance R' associated with a diode D'N'. These AND circuits prevent current flow, when a line of the display board is under tension, such as line 210 in FIGURES 2 and 3; the line feeds also by means of an interconnection device a vertical column p in FIGURE 1. This column should not be connected to ground, in order to enable one or several other interconnections to be placed at the intersection of the same column with other lines on data display board.

The role of the input and output members may be reversed. It is thus possible, by suitable figures, without feeding any lines, to sum up all the information corresponding to the magnitude p, the lines constituting then the outputs of the circuits; it is possible to place on these outputs of the circuits; it is possible to place on these outputs, for example in series or in parallel, an indicating device such as an electric lamp.

The numerical address of an information is made up in the following way; one or several key boards displays the numerical address N of the information which it is desired to test. This or these key boards are located close to one or more operators which may be located at a distance from the central data display board; a logical circuit of the type AND is adapted to combine the magnitude supplied by one of the key boards to direct it towards the line corresponding to the displayed address.

Use may be made of the key board of any numeration system. In the case in which use is made of a key board with decimal notation, each key board comprises a number of keys equal to the sum of the number of hundreds, tens and units considered. Thus for transmitting a number included between 0 and 999, it is necessary to provide ten keys for the hundreds, 10 keys for the tens and 10 keys for the units, that is to say a total of 30 keys, which may be grouped on 3 key boards of ten keys each, the said 3 key boards constituting the coding key boards.

Each key sends to an electrical connection a voltage equal to V' volts if the key is depressed, and equal to V'' volts if the key is released. One may choose for instance a negative value for V' and a value equal to 0 for V'' or any other quantity that may be desired.

To send for instance the number 210, one depresses key 2 in the hundreds, key 1 in the tens and key 0 in the units.

By means of the information given by one of the key boards coded on a decimal or other radix, the AND circuits provide an electrical voltage only on the line corresponding to the address of the information sent by the key board. This information may comprise as many digits as there are provided keys in the key board and as many outputs as there are lines on the data display board. In order to avoid connections between the output leads of the AND circuits and the data display board, the set of AND circuits is advantageously made by using the same printed board for the set of AND circuits and for the data display board. The set of AND circuits and the data display board will then contain a number of input connections equal to the number of keys of a key board and a number of output connections equal to the number p of columns. In the case of a decimal coding system and a three digits coding number, the arrangement will be as follows; assuming that the digits of the hundreds is $i$, the digits of the tens $j$ and the digits of the units $k$, the call or interrogation will be made by depressing simultaneously the keys $i, j, k$, of the key board. From the key board for the hundred, from the key board for the tens and from the key board for the units, ten leading out terminals respectively are provided and numbered 0 to 9; 00 to 90 and 000 to 900; in the case considered $N=210$; $i=2, j=1$, $K=0$.

The depressing of key 2 of the hundreds sends an electrical voltage to the output connection 2 for the hundreds; the output member 2 feeds then with electric current all the digits comprised between 200 and 299.

The act of depressing key 1 in the tens digits sends to the output terminal 1 of the tens a voltage different from 0 of negative value for example and on the other output members 0, 2, 3, 4, 9 there is a null voltage.

From the output member 2 for the hundreds there are ten branches corresponding to the tens 0, 1, 2, 3, 9 feeding the terminals designated by 200 to 209, 210 to 219, 220 to 229, etc., 290 to 299. Each branch for the tens comprises a series resistance R, and in parallel after the resistance a diode D connected to the corresponding output member for the tens.

The branches for the tens related to the hundreds 2 are therefore all fed with electrical current and there appears at each connection after the resistance R, at the junction point M between the diode and resistance a negative voltage V; two cases are therefore possible when considering one branch or connection.

(1) Point N of the corresponding output member for the tens, is at a negative voltage V'. The diode D being connected between M and N to conduct in the direction of N towards M, there will not remain on M a more negative voltage than that of the negative point of the numbers representing the voltages V, V′.

If $|V'| \geqslant |V|$, everything takes place as if the diode was not connected in the corresponding connection for the tens relating to the hundred 2, and takes place as if the supply voltage V was in series with a resistance R.

(2) The point N of the output lead for the tens is at a null voltage. The diode D may be assumed as transmitting a null voltage to M. If resistance R is greater to the internal resistance of the diode, Nm constitute then a connection of negligible resistance. Everything takes place as if the branch corresponding to the tens and associated with the hundred 2 was no longer fed with an electric voltage.

In the example considered, wherein the bar for the tens 1 is negative, the other bars 0, 2, 3, 4, ... 9 being at a null voltage, everything takes place as if a single output lead was supplying the number included between 210 and 219 by means of a voltage V in series with a resistance R.

From the output lead member 21 associated with the hundreds 2 and with the tens 1, there are ten output members corresponding to the units, 0, 1, 2 ... 9 and feeding the numbers 210, 211, 212, ... 219, and each branch of the units includes a series resistance R′, with the relation $R' \geqslant R$, and connected in parallel beyond the resistance R′, a diode D′ connected to the bar corresponding to the units.

The output members for the units associated with the number 21 are all fed with voltages and there is therefore a tendency for the setting up on each output lead after the resistance R′, at the junction point M′ of the diode and resistance, a negative voltage U proportional to V: two cases may arise when considering one output member:

The point N′ of the output member corresponding to the units is at a negative voltage V′. The diode D′ is connected between M′ and N′ in a direction conducting from N′ to M′; there will not remain on M′ a more negative voltage than the less negative of the two numbers U and V′.

If $|V'| \geqslant |U|$ everything takes place as if the diode D′ was not connected, and in the branch corresponding to the units relating to number 21 everything takes place as if the supply voltage V was applied through a resistance R in several resistances R′ in parallel, the voltage U being applied through the resistance R′.

The point N′ of output member corresponding to the units is at a null voltage. The diode D′ may be considered as transmitting a null voltage to M′ if the resistance R′ is greater than the internal resistance of the diode. M′N′ constitute then a connection of negligible resistance. Everything takes place as if the corresponding output member for the units associated with the number 21 was no longer under an electric voltage.

In the example considered wherein the bars of the units 0 are negative, the other bars 1, 2, 3, 4 ... ç being at a null voltage, everything takes place as if along the output member feeding the number 210 was connected to a voltage source V was suppling a resistance bridge through a series resistance R′, giving a negative voltage U.

Summing up, having actuated the keys corresponding to the number 210 on a decimal key board comprising hundreds, tens and units, the voltage V has been routed towards the output member corresponding to 210 alone. The other branches are no longer fed with voltages; the voltage V is transmitted through with a certain dampening since it is in series with internal resistance of rather high value. It is always possible to amplify if necessary the source of voltage thus supplied by means for example of a transistor operating as passing or not passing current or by means of any other suitable gating device.

The description of the set of AND circuits or logical block and of its operation has been made in the case in which the diodes DD′ are placed at the terminals MN and M′N′. It is also possible, in order to save on the number of diodes, to replace for each address of name N, the diode D located between NM or the diode D′ located between N′ and M′ or both of them by a resistance r located between M and N or by a resistance r′ located between M′ and N′; N and N′ which were brought to a null potential or to a negative potential will then be carried to either a positive or a null potential. The value of the resistance r′ for example is chosen in such a way that when r″ is at a null potential M being at a negative potential U, for example, M′ will still be at a negative potential, this potential being equal, for instance, to U/2. On the contrary, when N′ is at a positive potential, M′ must assume a potential greater or equal to 0, namely, a non-negative potential. Besides, if M is at a null potential, one can only have at N′ a null or positive potential, namely, a non-negative potential. The value of the resistance r′ is chosen so that R′ will not be traversed by too great a current. In order not to send positive potentials on the lines of the data display boards it is possible to provide in series with the lines of each address a separating diode $D_1$ for the purpose of blocking voltages greater or equal to 0. It will be noted that the schematic used here for negative voltages useful for transistors of current type may also be used with positive voltages, in which case the connection of the diodes must be permuted.

The explanation of the operation of the system of FIGURE 1 has been made on the basis of feeding first the hundreds, then by the set of electrical gates, the tens, finally, the units. It is understood that one may use the figures deducted from that one, by permuting the rule of the hundreds, the tens, and the units.

The numbered address of the information of which it is desired to know the value being formed corresponds to a determined position and is capable, if so desired, of being coded as a voltage, which can be considered as the voltage delivered by a high source of internal resistance is switched on the line corresponding to the called number, which voltage is sent by means of the corresponding key to the output of a column p for example.

This voltage supplied by the output p considered can be sent through a distance to a reading device by if necessary, the intermediary of an amplifier which will be for example of the on or off type using transistors if the voltage is supplied in a binary form; this voltage is used for controlling an optical displaying device such as a luminous signaling device. One may consider the broader case in which it is proposed to transmit to a distant point information no longer coded in digital form, but information provided in a semi-analogic manner with a scale of values; an indicator will then show a value proportional to the value of the voltage transmitted. All the channels p may thus be grouped in a single channel. There may be as many reading devices as there are outputs.

In the case in which the data display board is fed in a reverse direction, a voltage of suitable value is applied by means of a special set of keys with p keys on one column p, none of the normal input leads of the data display board being driven for example by the setting, under a null voltage, of the latter. The signaling may be achieved directly over the data display board by placing over each line a lamp either in series between A and B, the lamp being placed between the set of AND circuits and the data display board, or alternatively a suitable source of voltage being used in parallel between C and ground.

It should be understood that the scope of the invention is in no way limited to the circuits which have been described by way of examples and that changes are envisaged as well as substitution of equivalent elements without going beyond the scope of the present invention.

Without limitation as to the many possible applications, one may mention more particularly a device for reading from a distance a planning board used for supervising the achievement of a program for instance a program of manufacture or a commercial program.

To each numbered line N is allotted for example an order being studied for manufacture or sales, the state of achievement of the latter is for example materialized on the data display board by the position of a connecting member placed in one of the holes on the line under consideration; to each hole there corresponds a column $p$.

By depressing the keys for the address N on one of the key boards, there is lit on the luminous data display board located close by a lamp corresponding to the column $p$ above mentioned. It will be noted that if the state of manufacture of a given order must be materialized for example by the presence of several connecting members in different holes, one may always either divide the order considered in two parts or group several lines for the said address, each line having only a single hole used by the connecting member; on the luminous data display board, one will see, being lit at the same time, the lamps corresponding to the total of the columns used.

There is provided the possibility of driving the data display board in the reversed direction through the columns totalizing in this way all the lines crossing each other electrically with one column $p$ considered. A key board located close to the data display board will drive the column $p$ considered and along each line crossing electrically with this column, a lamp will be lit.

A broad use of a planning system by electronic means consists in giving to the various stages of progress of a manufacturing program an advance or a delay over the program initially provided. For each address of program considered, a comparison is made between the real state of the manufacture materialized by the position of an interconnecting member $i$ on the line corresponding to the data display board at the state provided by the initial program materialized or not by the presence of a connecting member in the column $j$.

According as to whether $i$ is greater, lower or equal to $j$, there is an advance, a delay or a coincidence in the real state at the moment considered of the manufacture with respect to the state of the manufacture as foreseen. One may drive by the same address two lines, namely the line of the real program and the line of the program foreseen, a switch routing the voltage either to the line of the real program or to the line of the program foreseen. A master clock may be provided for supplying for each unit of time a reference signal which may also drive any type of device provided by means of an impulse counter, for example of the bistable type with transistors, thus permitting one to fix for each program an address corresponding to different data concerning the manufacture materialized by a printed board or a perforated card representing the present state with respect to the initial time at the start.

The invention is capable of other applications, both in the field of telephony and in that of luminous signaling and for order transmission given from a distance in particular in industrial, commercial or touristic installations such as calling boards for hotel services.

The device applies more generally to an installation utilizing a data display board with electrical interconnections analogous, for example, to those described previously; these boards being driven through a logical system of the type considered above thus permitting the electric routing of a coded order on to the input of the said data display board.

What I claim is:

A system for ascertaining from a distance the existence of electrical connections between N horizontal and $p$ vertical members carrying electrical conditions arranged in a matrix, said system comprising an interrogatory key set having a number of keys corresponding to the maximum number of interrogations to be simultaneously ascertained and having a number of wires coresponding to the maximum number of interconnections on said matrix, a set of AND circuits, said number of wires connected between said number of keys and said AND circuits, the outputs of said AND circuits being connected to the N horizontal members, a utilization device connected to the vertical members, said utilization device comprising a display device, whereby when a predetermined number of electrical connections are made on said matrix and when the corresponding interrogating keys are actuated, the said display device indicates whether said interconnections have actually been made, and means connected to said display device for comparing any two sets of electrical conditions successively displayed on said display device and for providing information indicative of the successive matrix interconnection status.

References Cited by the Examiner

UNITED STATES PATENTS

| | | | |
|---|---|---|---|
| 2,244,700 | 6/41 | Horton | 340—166 |
| 2,446,643 | 8/48 | Farmer | 340—166 |
| 2,621,241 | 12/52 | Jensen | 340—166 |
| 2,813,986 | 11/57 | Dickinson et al. | 340—166 |
| 2,872,664 | 2/59 | Minot | 340—166 |
| 3,003,143 | 10/61 | Beurrier | 340—166 |

ROBERT H. ROSE, *Primary Examiner.*